April 8, 1924.
R. H. ROBINSON
1,489,967
REENFORCED CONCRETE AND STEEL SHIP CONSTRUCTION AND METHOD OF MAKING THE SAME
Filed Feb. 13, 1918   10 Sheets-Sheet 2
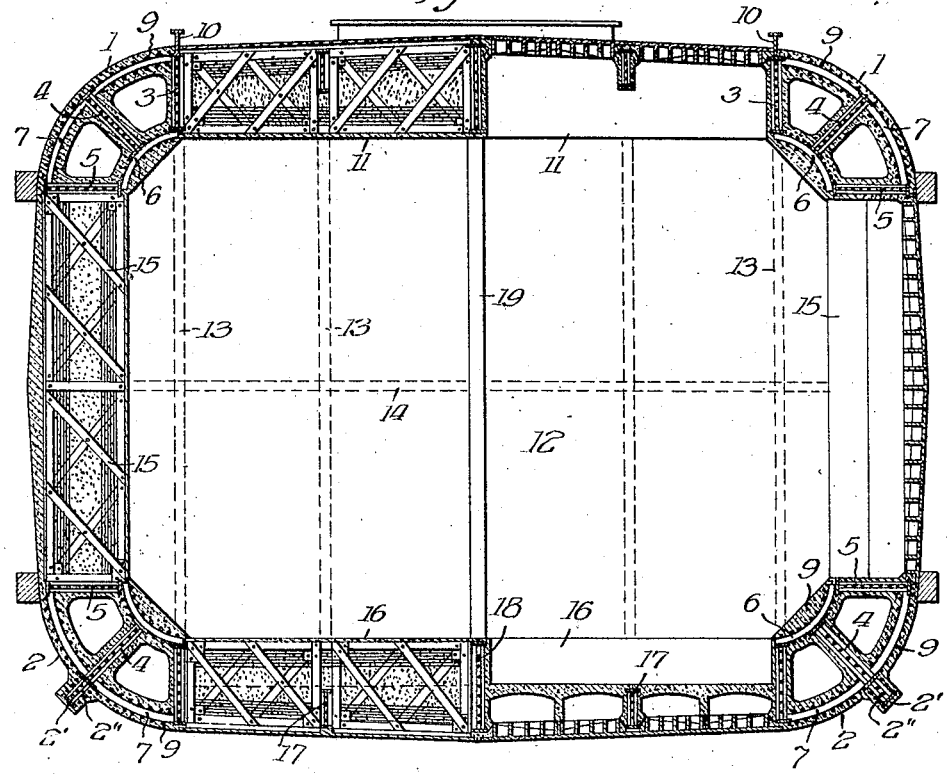
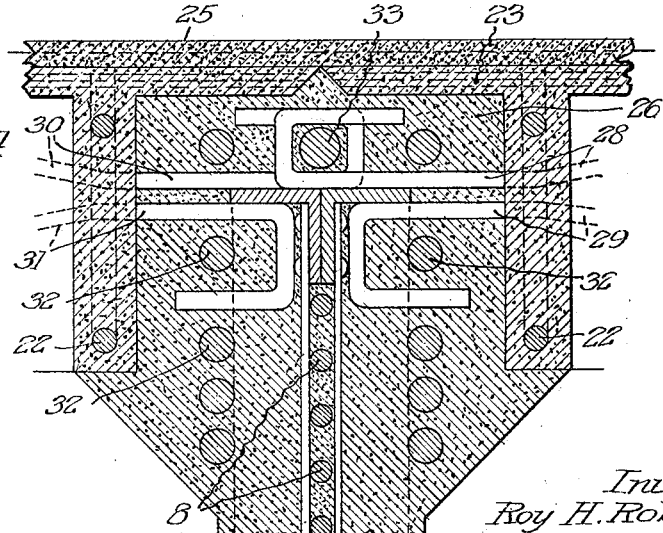
Inventor
Roy H. Robinson
By Offield Towle Graves & Offield
Atty's

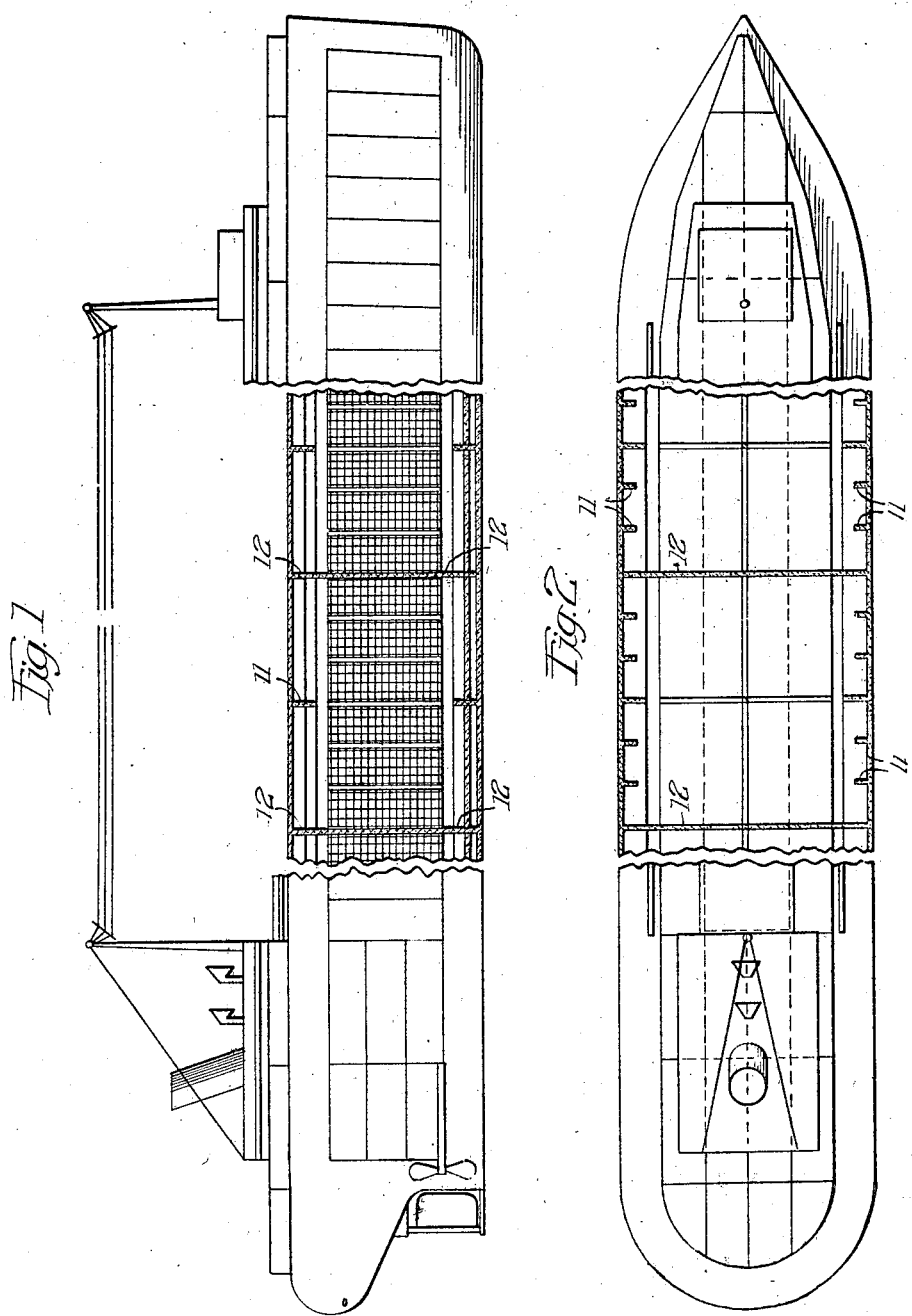

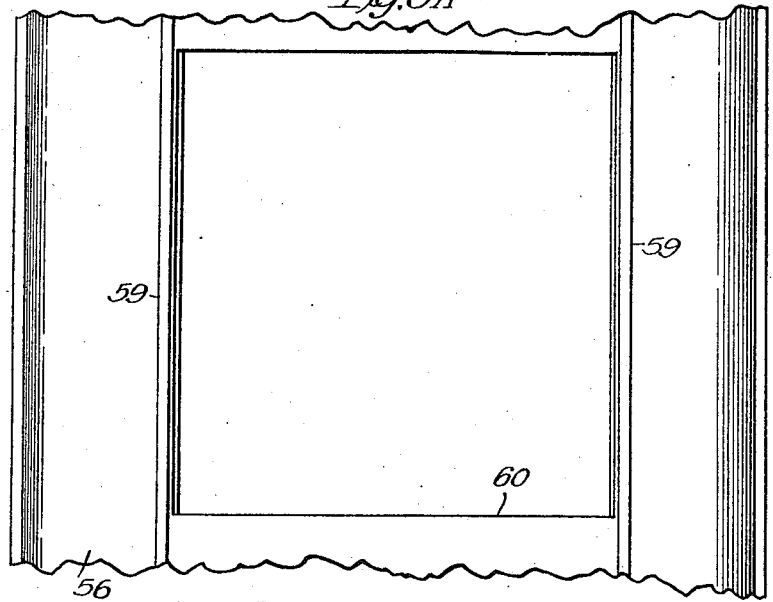
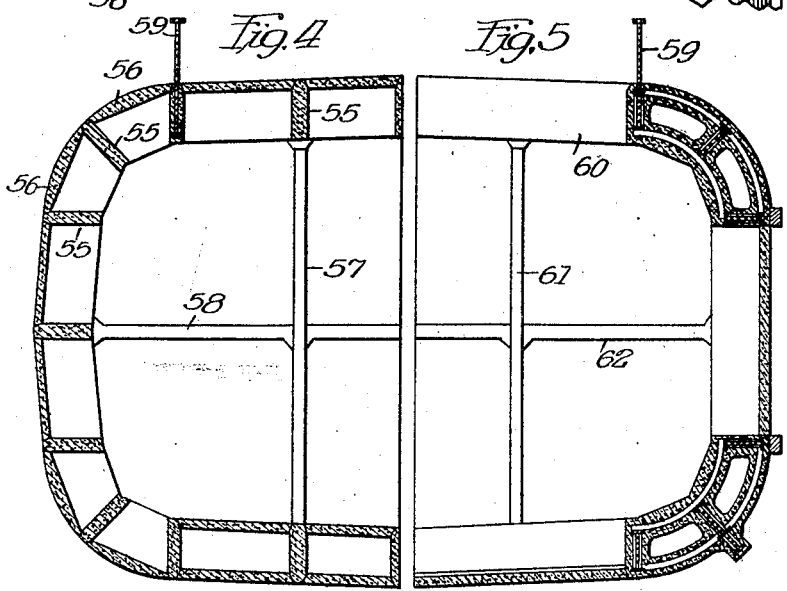

April 8, 1924.
R. H. ROBINSON
1,489,967
REENFORCED CONCRETE AND STEEL SHIP CONSTRUCTION AND METHOD OF MAKING THE SAME
Filed Feb. 13, 1918    10 Sheets-Sheet 4
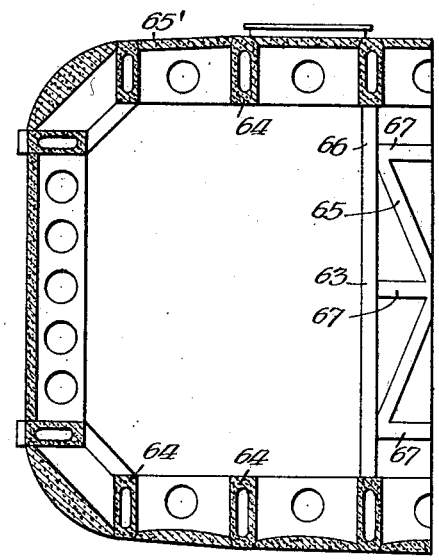
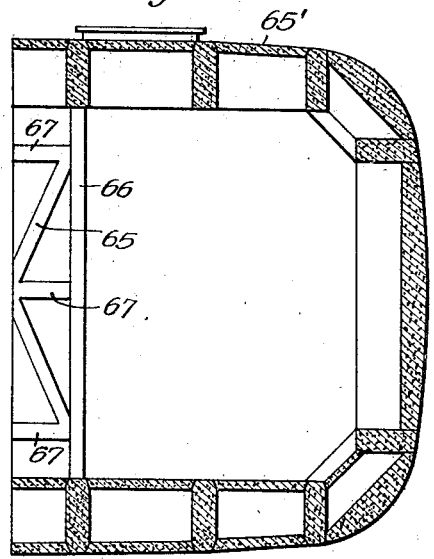
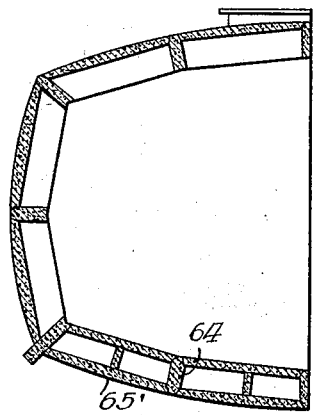
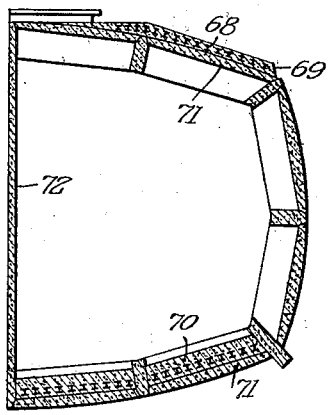
Inventor
Roy H. Robinson

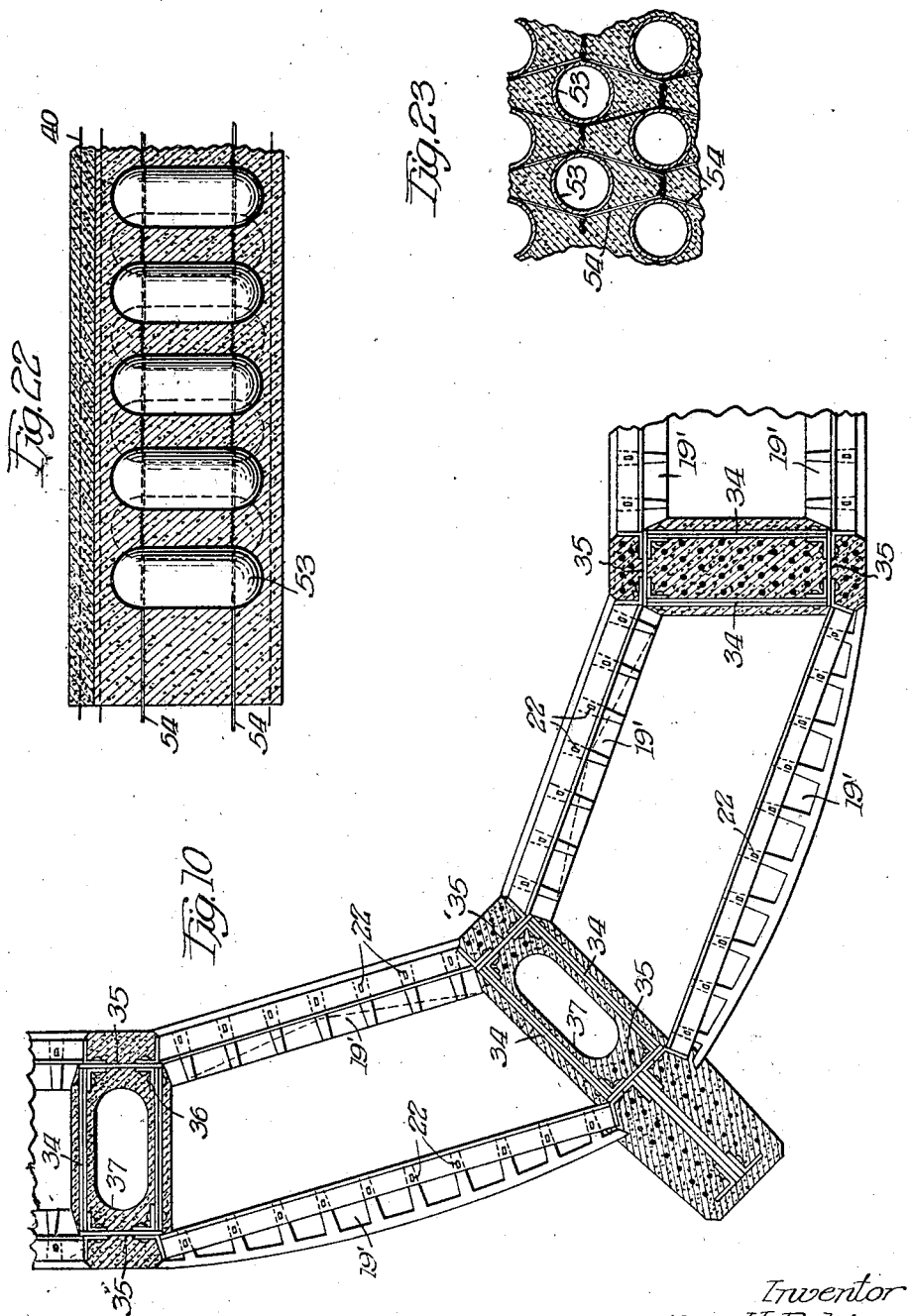

April 8, 1924.  
R. H. ROBINSON  
1,489,967  
REENFORCED CONCRETE AND STEEL SHIP CONSTRUCTION AND METHOD OF MAKING THE SAME  
Filed Feb. 13, 1918   10 Sheets-Sheet 6
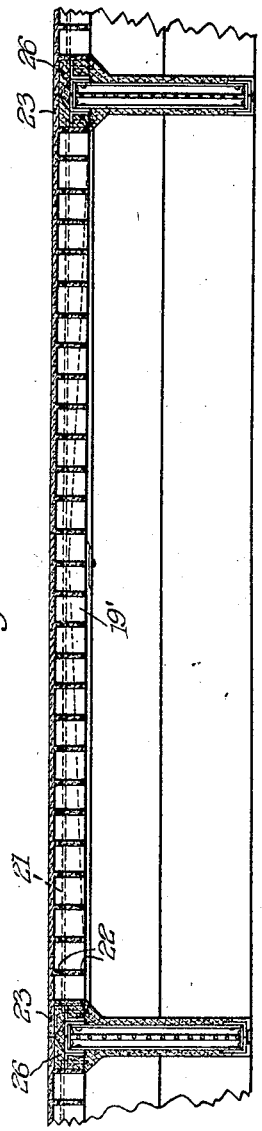
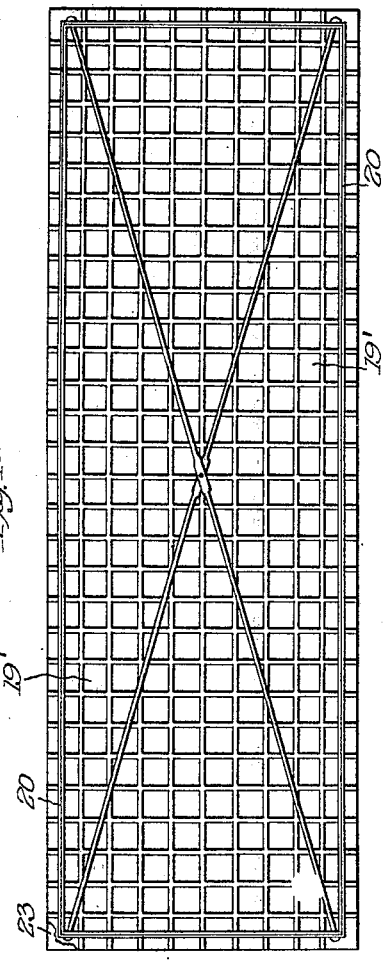
Inventor  
Roy H. Robinson April 8, 1924.  R. H. ROBINSON  1,489,967
REENFORCED CONCRETE AND STEEL SHIP CONSTRUCTION AND METHOD OF MAKING THE SAME
Filed Feb. 13, 1918    10 Sheets-Sheet 7
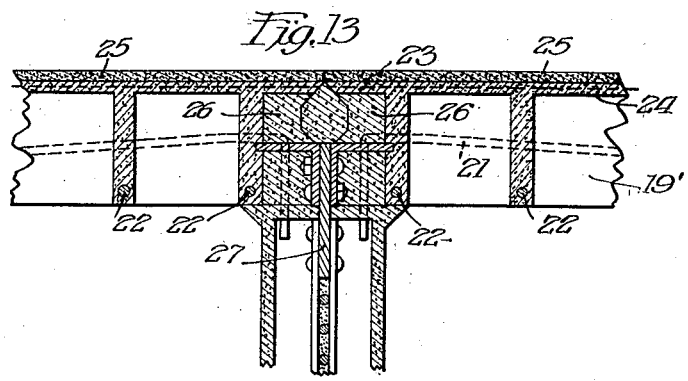
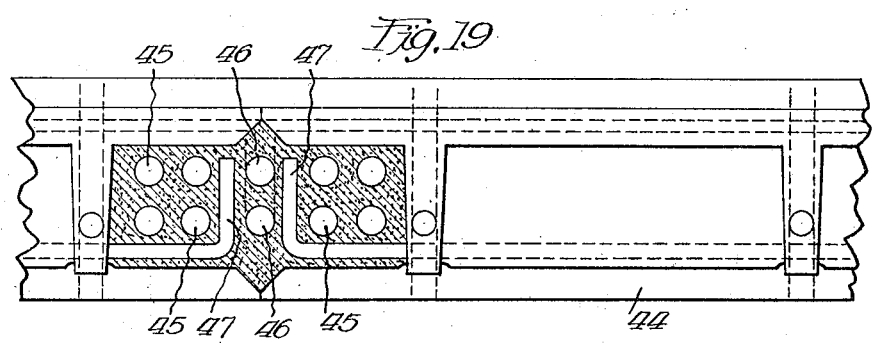
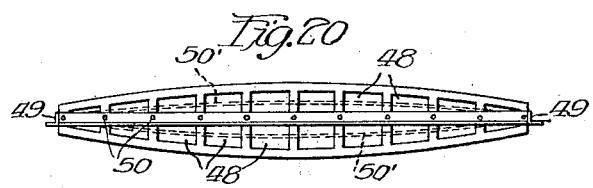
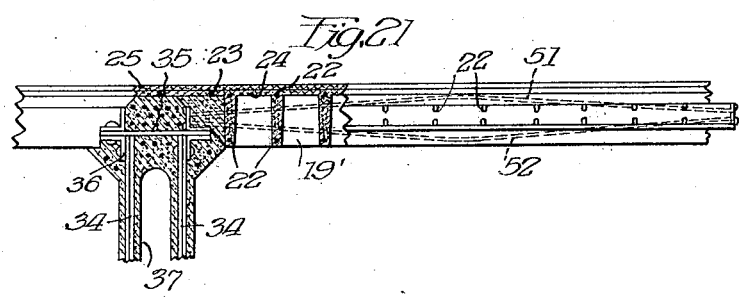
Inventor
Roy H. Robinson
By Offield, Towle, Travis & Offield
Attys April 8, 1924.
R. H. ROBINSON
1,489,967
REENFORCED CONCRETE AND STEEL SHIP CONSTRUCTION AND METHOD OF MAKING THE SAME
Filed Feb. 13, 1918     10 Sheets-Sheet 8
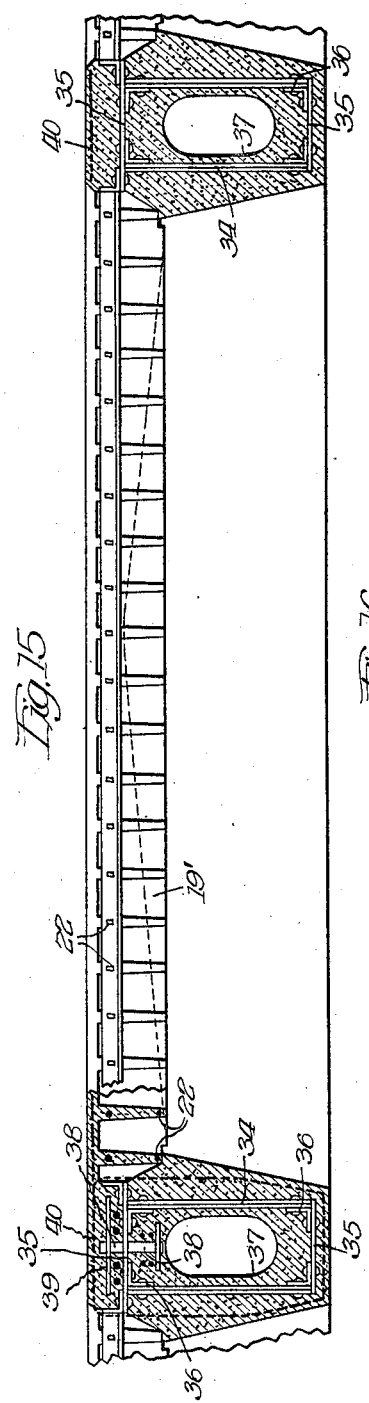
Inventor
Roy H. Robinson,
By Offield, Towle, Graves & Offield
Attys April 8, 1924.　　　　　　　　　　　　　　　　　1,489,967
R. H. ROBINSON
REENFORCED CONCRETE AND STEEL SHIP CONSTRUCTION AND METHOD OF MAKING THE SAME
Filed Feb. 13, 1918　　10 Sheets-Sheet 9
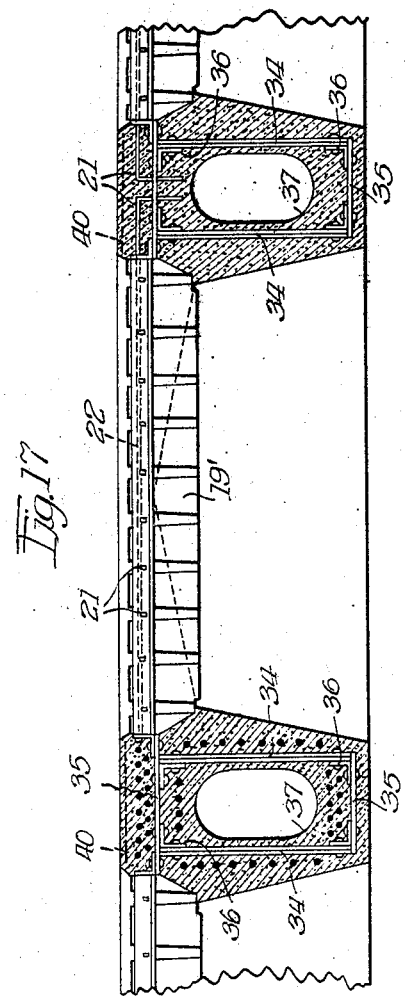
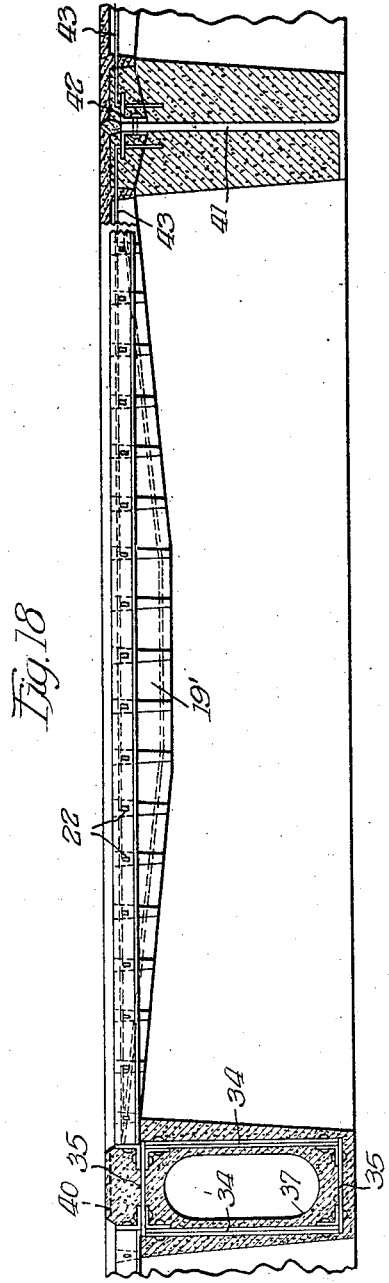
Inventor
Roy H. Robinson
By Offield, Towle, Graves & Offield
Attys April 8, 1924.  1,489,967
R. H. ROBINSON
REENFORCED CONCRETE AND STEEL SHIP CONSTRUCTION AND METHOD OF MAKING THE SAME
Filed Feb. 13, 1918   10 Sheets-Sheet 10
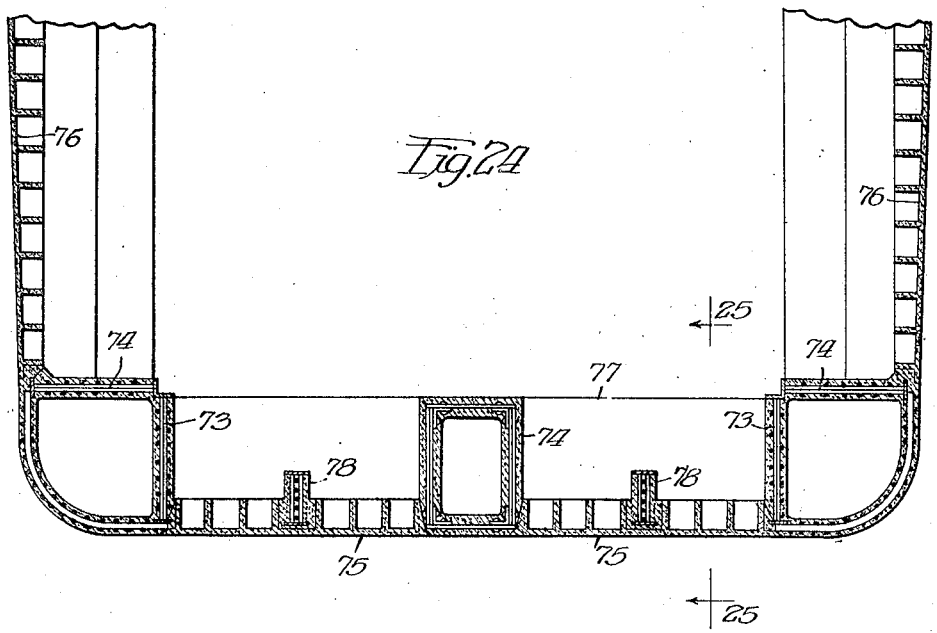
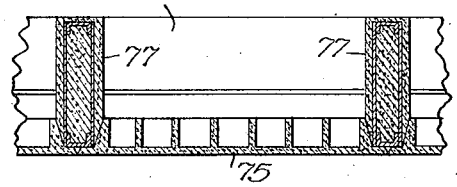
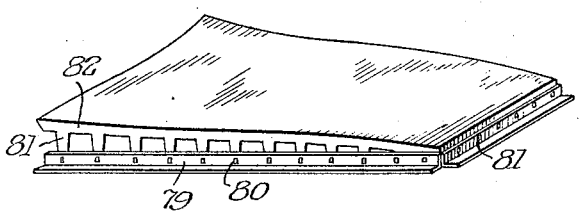
Inventor
Roy H. Robinson Patented Apr. 8, 1924.

1,489,967

UNITED STATES PATENT OFFICE.

ROY H. ROBINSON, OF CHICAGO, ILLINOIS.

REENFORCED CONCRETE AND STEEL SHIP CONSTRUCTION AND METHOD OF MAKING THE SAME.

Application filed February 13, 1918. Serial No. 216,873.

*To all whom it may concern:*

Be it known that I, ROY H. ROBINSON, a citizen of the United States, residing at Chicago, in the county of Cook and State of Illinois, have invented certain new and useful Improvements in Reenforced Concrete and Steel Ship Construction and Methods of Making the Same.

My invention relates to improvements in the construction of concrete and steel ships, including the improved methods of making the same, said improvements being in part in the nature of modifications and developments of the invention set forth in my copending application, Serial No. 205,819, filed December 7, 1917.

Among the principal objects of the present invention are to provide a characteristically new type of ship construction, wherein the predominant or major strength of framing is secured by a system of unusually stiff longitudinally-disposed beams, extending from prow to stern, connected at unusually long intervals or spans by transverse girders, and forming what I term a "longitudinal type" construction; to provide as a feature complementary to such "longitudinal type" construction, minor or sub-frame units which serve the double function of forming a light framing between the intersections of the longitudinal and transverse main frame members and at the same time form the shell or outer wall-proper of the hull; to provide a form of construction and method of assembling the same whereby the necessity of ship ways is dispensed with and in lieu thereof buoyant hollow frame members are first assembled while floating upon the water, the spaces between the assembled members thereafter closed by reenforced concrete construction wall still floatant, to form as a part of the hull a floating section and thereafter additions made to this hull section to complete the hull structure upon the water; to provide a ship of reenforced concrete and steel formation, which is so constructed as to compare favorably in lightness of weight with an all-steel ship of similar dimensions; to provide a ship hull which, if desired, may be made lighter than the hull wall displacement of water, so that it will not sink even though the hull be flooded within; to provide a scheme of construction which will permit of the manufacture of the structural elements which, when assembled, form the hull, and has independent standardized operations, carried on in advance of the assembling or building of the ships themselves; enabling said standardized operations to be simultaneously carried on at various localities most advantageous for rapid and economical production and without reference to whether the same be adjacent to the shipways or docks or not; to provide a ship having a hull shell of extreme thinness and lightness yet nevertheless affording great strength and rigidity; to provide a hull construction impervious to the deleterious effects due to the abrasion of the surface of concrete by water, and impervious to the absorption and penetration of salt water or other moisture; to provide standardized stock units of hull members, which are capable of being assembled to provide variously designed hulls; to provide improved methods of making such standardized unit constructions and improved methods of assembling the same.

A leading object, in view of our present state of war, is to provide improvements in ship construction which will permit of the quick and simultaneous formation and assemblage of hulls for a great mercantile war fleet of concrete ships, immediately upon conclusion of test designs of experimentally formed hulls, without meanwhile delaying the production during the time consumed in experimentation with said test hulls; another object is to provide a system or plan of rapid ship construction, for present war emergencies. which will largely utilize combinations of tested and known elements, so that the ship hull while enjoying all the benefits of the expeditious and economical construction attending the use of concrete, is in its structural formation not an untried experiment, as is the present day case with a large reenforced concrete hull, but instead one of tested and established elements, assembled in conformity with marine engineering experience, so that there is no uncertainty as to the strength, utility or behavior of the finished hull; another object is to provide a plan for immediately constructing the parts for a large quantity of ships without awaiting the results of experimental tests on preliminary experimental hulls and still be able to utilize these parts for any adopted designs of hulls, varying in size or shape or strength of component elements, resulting from preliminary experience derived from the first test hulls; another object is to provide a concrete hull which can be built in whole or greater part without the use of forms in the field, and a shell framework which can be fabricated in standard units in bridge shops, throughout the country, with a minimum amount of material and labor and shop equipment, and such framework elements used interchangeably in different portions of the hull, by adding simple auxiliary members in the field; to produce what may be aptly termed a fabricated-concrete steel ship which can be assembled from simply formed stock elements, with great rapidity, economy and a very small amount of labor, while employing materials most readily obtainable; to provide a construction eliminating large amounts of field riveting in the assembling of the ship's hull, by securing the hull plates to the framework in immovable position through the medium of concrete; to provide hulls wherein the portions requiring the greatest strength and exposed to the greatest strains and punishment, are formed in the field of steel and concrete, while the subordinate portions or those not so stressed or exposed and not providing the main elements of strength, are pre-cast and prepared in advance; to provide a hull composed of a number of pre-formed sections monolithically and rigidly united into a complete watertight hull of great strength and enduring quality; to provide a reenforced concrete hull with an elimination of customary form work and at the same time securing a shell of an exact thickness and superior quality throughout, and made under direct observation; to provide a concrete hull wherein the main reinforcing steel will be protected by being placed at a relatively great distance from the face of the concrete exposed to the water; to provide a method of concrete ship construction which will permit of the use of different kinds of concrete in different portions of the members, for attaining particular effects at different points in the structure; and to provide a means for building a concrete ship hull while at the same time incorporating an exterior layer of asphaltum concrete or other desirable material for protecting it.

Describing generally and briefly some of the principal features involved in my invention, it may be stated that the hull is constructed from a quantity of previously cast reenforced concrete ship plates, assembled on a structural frame work, which may be either of reenforced-concrete design, or of structural steel, or a combination of light structural steel shapes, assembled and reenforced, in combination with concrete and specially supplemented at desired points with additional reinforcing rods, to provide most readily the necessary cross-sections of steel.

A particularly desirable form of this construction, embodies the combination of these pre-cast plates for certain portions of the hull, in union with other sections and members which are poured or concreted in place, in the building of the hull. The pre-cast plates are reenforced in such way that the metal so employed in them can be made to serve to the best advantage in providing for the longitudinal and transverse strains to which the ship is exposed. Their assemblage in the field upon the framework of the hull is accomplished either by the interengagement of the reinforcements projecting from the plates with the concrete reinforcements or structural steel of the framing members, or the union may be secured, rather preferably, by bolting, riveting or suitably anchoring by other feasible means, the plates to the steel of the framing members. This can be done, in most instances, quite after the manner of assembling steel work, or the building of a steel hull.

A particular feature of this invention provides for the framing and building of these pre-cast plates each within, or in association with, a steel frame. The framing members of this framework, when the plates are connected with the structural framing of the hull, become, in turn, necessary members of the steel hull frames, so that the necessary metal for these hull frames is provided at the proper points by these steel shapes of the pre-cast plates, thus serving a two-fold purpose.

The preferred form of construction, contemplates the use of light structural lattice framing for the main structural frame member of the hull; the latter forming longitudinal stringers and transverse ribs. These beams and girders, by virtue of their latticed construction, are formed with relatively great depth, so that when subsequently covered and embedded in a shell of concrete they have the necessary rigidity and provide frames of extreme strength, with a minimum of weight and the most economical use of materials. Any suitable and preferred shapes may be used in forming the structural framing, and where the necessary cross section requires it, steel plates may be used in the fabrication of this framing. For the most part, however, this is to be avoided, the purpose being to utilize light steel shapes, most readily produced and obtained, using trussed lattice construction, the material for which is most readily secured, is most economical and is most suitable in combination with concrete. This serves not only to fireproof the steel, but so reinforces and strengthens it as to permit of great depth in the design, while at the same time employing a comparatively small quantity of steel.

A further particular feature of my construction is the assemblage of the plates and framework with a minimum amount of field work, and particularly that of the more skilled and higher priced mechanics, such as iron workers and riveters, of which the supply in the present extremities is very deficient. By concreting the points of union between the pre-cast plates and the framework, the necessity of riveting is obviated. While the steel framework or the steel connections on the pre-cast plates may be riveted to the steel framework of the hull, this is not necessary, and the union can be reliably made by merely bolting, or even simpler mechanical interlocking unions, as the application of the concrete finally binds the members in a permanent union so that no movement or separation is possible.

In order to further simplify and standardize the construction, I preferably form the framework of the shell sections of latticed steel in straight sections rather than curved lines, so simplifying the fabrication. The desired curve and contour of the hull are then secured by warping or curving the faces of the plates or casting them at different angles within the framework. Thus the steel framework itself follows straight lines and attaches to similar straight members of the hull framing. The concrete of the plate or the face of the plate and the concrete plated in uniting the plates and the hull framework is then given the desired cant, angle or curve to develop the curved and properly converging lines of the finished hull. By this means, large quantities of latticed frame sections or trusses of standard size can be fabricated in bridge and structural steel shops throughout the country, with a minimum of labor and shaping. These frame sections, delivered at the ship yard, can be quickly assembled into hull frames, and are, for the most part, interchangeable in forming standard ships. Additional cross section of steel, for those members requiring additional strength, is then supplied by attaching to these frames additional steel in the shape of bars or other suitable reinforcements. By this means a large proportion of the steel employed is furnished in the cheapest form (rods, bars and straps) and without fabrication or shop work.

In the construction of an ocean ship of great length and carrying capacity, it is found that a relatively large quantity of longitudinally disposed steel is required to provide for the excessive longitudinal tensional strains, to which the upper and lower portions of the hull are alternately subjected. Because of this, it is found that an ordinary design in reenforced concrete, which would supply the necessary cross section amount of steel with a corresponding proportion of concrete required to carry this steel, would make an excessively heavy hull. The overcoming of this handicap is one of the important and distinctive features of my invention. I utilize a large proportion of this required longitudinal steel to form very deep and powerful longitudinal girders or stringers, or other longitudinal supporting framework, which I support in long spans upon transverse bulkheads, at the same time, thereby eliminating a large part of the otherwise necessary and customary transverse ribbing, employed in conventional ship design at present in vogue. By combining such framing with pre-cast shells, which I am able to produce in designs of great strength but light weight, I secure ship hulls of extreme lightness, which will compare favorably with those of steel, but which by my methods of construction can be built with much greater speed and facility and far less expense.

By combining this general plan of securing lightness of construction with the use of cellular pre-cast plates, or by so combining plates as to make cellular wall and bulkhead construction, I further minimize weight.

By the formation of stringers, ribs and other structural members, with cellular or hollow interiors, and in some instances employing a cellular formation of the concrete itself, I am able to produce a hull, the structure of which displaces more than its own weight in water, so that even though the hull were flooded within, it would remain afloat.

In the drawings—

Fig. 1 is a side elevation of a ship with intermediate parts broken out to shorten the figure and its central portion shown in longitudinal vertical section; the inner face of the remote side of the hull being also shown.

Fig. 2 is a plan view of the ship shown in Fig. 1, also with intermediate parts broken out and a mid-length part shown in horizontal section.

Fig. 3 is a cross sectional view of a preferred form of hull construction, said view being taken in parts of two different planes, namely in a plane alongside of a set of transverse girders as to the left hand half of the view and in a plane between the girders as to the right hand half of the view.

Figs. 4 and 5 show cross sections of halves of hulls; Fig. 4 showing solid reenforced concrete longitudinals and Fig. 5 hollow reenforced concrete longitudinals and both of these views showing the hull equipped with a track rail girder extending longitudinally along the deck.

Fig. 5ᴬ is a plan view of a portion of the hull shown in Fig. 5, showing particularly the arrangement of the cross hatches and their relations to the girder track rails.

Figs. 6 and 7 show another pair of half hulls, in cross section, both of which hulls are provided with a special form of internal pillar bracing and both of which show modifications in the hull wall construction.

Figs. 8 and 9 show another pair of half hulls, in cross section, embodying still further modifications.

Fig. 10 shows a fragmentary cross sectional view of a cellular hull wall of modified construction.

Fig. 11 is a longitudinal sectional view through a panel plate and the transverse girders to which it is attached.

Fig. 12 is an inside face view of the panel plate detached.

Figs. 13 and 14 are sectional details showing different ways of uniting the edges of the panel plates to main frame members of the hull.

Fig. 15 is a longitudinal sectional view through a pair of transverse girders of the hull frame and through a panel plate extending between and connected to said girders.

Fig. 16 is an inside face view of the panel plate shown in Fig. 15 but detached from the girders.

Fig. 17 is a cross sectional view of the panel plate shown in Fig. 15 but taken at right angles to the latter and through a pair of longitudinal frame members.

Fig. 18 is a sectional view similar to Fig. 15 but showing a modified construction; the girders being also of modified construction.

Fig. 19 shows a fragmentary sectional detail of a hollow or double walled panel plate and also a desirable way of uniting it to a reenforced concrete frame member of the hull.

Fig. 20 shows in edge elevation another modification of the double walled hollow panel plate.

Fig. 21 shows a form of panel plate in which the reinforcing rods are so disposed as to best stiffen the plate against both outward and inward pressures.

Fig. 22 is a longitudinal sectional view of a panel plate having an expanded concrete body.

Fig. 23 is a cross sectional view of the panel plate shown in Fig. 22.

Fig. 24 is a transverse sectional view of the lower half of a hull of modified construction, the main frame members of which are made hollow and buoyant to enable a novel method of erection to be carried out.

Fig. 25 is a fragmentary longitudinal section taken on line 25, 25 of Fig. 24.

Fig. 26 is a perspective view of a preformed panel plate having a warped exterior contour.

Referring first to Figs. 1, 2 and 3 of the drawings, 1, 1, designate as a whole main upper longitudinal stringers located at the junction of the side walls of the hull with the deck, and 2, 2, designate similar longitudinal stringers located at the junction of the side walls with the bottom wall of the hull, i. e., along the line usually occupied by the bilge keels. These upper and lower main stringers are generally similar in construction; are of reenforced concrete, made hollow, and extend from prow to stern of the vessel. As shown, and as preferably constructed, each longitudinal comprises three radially disposed main reinforcements, 3, 4, 5, a series of concentrically and transversely disposed bar-like reinforcements, 6 and 7, uniting the radial reinforcements at suitable intervals; longitudinally disposed rod reinforcements associated with each of the main radials and with each of the transverse bar segments, and concrete enveloping and uniting all reinforcements into a rigid stringer or beam construction. The radial main reinforcements are desirably made by setting pairs of angles back to back to form the upper and lower heads and connecting these heads by crossed lattice bars in the same manner as the transverse girders shown in Figs. 3 and 14. Such construction is in strength and function closely analogous to a plate girder or I-beam but is much more cheaply constructed and anchors with the concrete better. Between the two sets of lattice bars I interpose rod-reinforcements 8, which may be distributed at uniform intervals, as shown in the drawings, or grouped near the heads of the skeleton girder so as to better withstand the bending stresses in the plane of the girder. The transverse bar segments 6 and 7 are suitably associated with the radials and in addition to their reinforcing functions serve as supports upon which to mount the longitudinal reinforcing rods 9 pending their envelopment with concrete. As shown, there is a series of such reinforcing rods 9 both outside and inside of each series of bar segments. It will be understood that these metal skeletons will be made in suitable lengths and joined end to end during erection; the rod reinforcements thereof being preferably applied after the main skeletons are joined so that they may break joints. Suitable centerings and forms are set up around and inside of the stringer skeleton, and the concrete thereafter poured so as to envelop the skeleton and produce the desired external form and internal hollow construction; such work being common and well understood in this art without further description.

Each of the upper main longitudinals 1, 1, is in the form being described provided at its upper side with a plate girder reinforcement 10, which at its base is united directly to the upper end of the corresponding radial reinforcement 3 and rises a substantial distance above the surface of the deck of the ship. As clearly shown in the drawings, the lower part of each plate girder is embedded in the outer layer of concrete, and thus anchored to and made rigid with the stringer structure. These plate girders not only serve to greatly reinforce the hull structure against vertical bending stresses but they also serve as guard rails for the deck, and may be further utilized as track rails for a purpose hereinafter more fully described.

The lower main longitudinals 2, 2 are constructed substantially like those just described, except that the bilge keel projection 2' is preferably formed upon each; these bilge keel projections or ribs being conveniently formed by providing an extension lattice girder 2'' connected to and aligned with the central radial reinforcement 4 and provided with a series of rod reinforcements, as clearly shown in the drawings. The skeleton projection so formed is invested with concrete like the rest of the stringer.

It will be noted that each stringer is segmental in cross sectional shape; that its lateral sides are at right angles to each other, i. e., 90° apart, and that therefore the stringers are in cross sectional shape best suited to unite with straight, square-ended transverse girders and ribs.

In the construction being described, the main longitudinals are supported in suitably spaced relation to each other by transverse girders, each designated as a whole 11, alternated with bulkheads, each designated as a whole 12, throughout the length of the ship.

The bulk heads 12 are interposed between the girders 15 and 16, as indicated in Fig. 3, said bulk heads being of ordinary reinforced concrete construction, or, as I prefer, of pre-cast panels.

The transverse girders, as shown in Fig. 3, desirably consist of lengths of skeleton girder plates formed of angle iron heads and lattice work webs, practically like the members 3, 4 and 5 of the main longitudinals hereinbefore described and, like the latter, reenforced between the lattice tiers by longitudinal reinforcing rods, as shown clearly in the drawing. In the instance of these cross girders, the longitudinal reinforcements are disposed near the edges of the skeleton girder plate so as to secure maximum stiffness in the plane of the girder, and said reinforcements are arranged so as to overlap and bridge the joints between the adjacent ends of the connected girder units.

In the preferred hull being described, the upright or side girders 15 extend from the upper longitudinal to the other uninterruptedly, but in the case of the bottom of the hull and the deck construction the main girder members 16 do not extend from side to side uninterruptedly, but are interposed between longitudinals 18. The sub-longitudinals 17 are of lattice girder construction of about half the depth of the main transverse girders 16, and of similar construction. The longitudinals 18 are disposed along the median line of the hull and are of the same width or depth as the transverse girders, and are of substantially the same construction, as shown clearly in the drawing. I also preferably install structural columns along the median line of the hull midway between the bulkheads, as indicated at 19.

The rectangular spaces formed by the intersecting main frame members hereinbefore described are occupied and covered by pre-formed panel-like reenforced concrete plates of special construction, which I will now describe.

Referring to Figs. 11 and 12, one of these plates and its association with the main frame members is shown in detail. The plate designated as a whole 19' is of precast construction, and is formed by providing an angle iron or other suitable marginal metallic frame, connecting two series of cross reinforcing rods to said frame in such way as to produce a rectangular mesh, and then casting the concrete in such form as to invest the mesh, produce an intersecting ribbed inner side, and a continuous web or sheet outer side of concrete. In forming these plates, the marginal frame 20 is first made, the two sets of reinforcing rods 21, 22, next attached thereto, conveniently by hooking them into apertures in the angles; the metal skeleton thus formed next superposed above a mold-plate, which in face construction is the reverse of the series of intersecting ribs which the plate is to have and which mold is provided with a rim corresponding to the full depth of the proposed plate. Said mold is also so formed as to produce a surrounding flange-like extension 23 on the finished plate, as best seen in detail Fig. 13. The metal reinforcing grid having been properly superposed above the mold, the concrete is poured to fill the form, and the top screeded off to provide the comparatively thin but uniformly thick outer web 24 of the plate reenforced with meshing.

As a further special feature of such plate construction, I provide an outer layer 25 of bituminous concrete, which is thoroughly waterproof, and is applied as a second operation after the concrete proper has been poured, screeded and hardened. Such bituminous concrete is well known in the art and requires no detailed description.

The panel plates of such construction may be attached to the longitudinal and transverse frame members of the hull in various ways so as to produce a rigid metal to metal union and joints which are capable of being readily made both monolithic and waterproof. For example, as shown in Fig. 11, the vertical web of the marginal angle of the plate is riveted to a similar angle back to back, and the horizontal web of the latter angle riveted directly to the corresponding angle of the skeleton girder of the main frame. When the pair of plates, one at each side of the main frame member, have been applied, a closed space 26 is provided which is filled with concrete, thus monolithically joining the adjacent edges of the plates and at the same time making a watertight joint and investing the outer surface of the skeleton frame member.

As shown in detail Fig. 13, a somewhat simpler and economical skeleton girder frame member is provided, and the attachment thereto correspondingly varied. In this detail the lattice members of the girder are attached to a web or plate 27 instead of to an angle iron head, and the marginal angles of the panel plate are in turn attached directly to the plate 27. In this construction the concrete cast in to complete the joint is made to invest the angles both inside and outside of the outstanding webs of the latter.

In Fig. 14 I have shown a detail cross section showing a modified form of panel plate construction and a correspondingly modified form of connection between the plate and the skeleton girder frame. The panel plate is formed without the marginal metal frame member and the reinforcing rods 28, 29, 30 and 31 extended beyond the marginal ribs of the plate. These extended reinforcement rods are formed into hooks, as shown clearly in the figure, and these hooks are interengaged with the skeleton girder reinforcements, as indicated at 32 and 33. The plates are adjusted in proper position relatively to the skeleton girder, and thereafter the reinforcements 32, 33, placed in position; the single reinforcement 33 being slipped through the overlapped hooks of the outer reinforcements, so that these reinforcements are in effect united with each other. The investment of concrete which is poured after the plates have been assembled and connected with the skeleton girder completes the union.

In Figs. 15, 16 and 17 I have shown a panel plate construction generally similar to the construction shown in Figs. 11 and 12, but united with main frame members made hollow. The general construction of the several frame members shown in cross section in these figures is the same, but the main frame member at the left-hand side of Fig. 15, and that at the right-hand end of Fig. 17 vary slightly from the other two. In each case a skeleton girder rectangular in cross section is formed of side lattice members 34, top and bottom lattice members 35, and corner angles 36. In forming these beams or frame members, suitable forms are set up to receive the skeleton girder member described, the forms being so constructed as to provide the "keystone" cross sectional shape shown. The top lattice work 35 is left exposed in the molding of the concrete. Before the concrete is poured the desired longitudinal reinforcements, as for example those at each side of the skeleton girder frame and those within the girder frame at the top and bottom thereof, are placed in position. So also a core mold is placed to provide the central cavity 37 in the frame member. In the case of the frame member at the left-hand end of Fig. 15, a reinforcement with tie bolts and straps, designated 38 is also placed in position before pouring; the stem of this reinforcement being left to protrude above the beam proper. Afterwards when the panel plates are to be connected to the beam, cross strap or plate-like reinforcement 39 is secured to the stem of the reinforcement 38; additional rod reinforcements being also interposed between the plate 39 and the top side of the skeleton girder. The panel plate of this figure has a marginal angle iron frame, one web of which is arranged to overlie the upper edge of the skeleton girder and is bolted thereto, as shown clearly in the figures. The netting reinforcements of the panel plates are extended beyond the edges of the latter in overlapped relation at the joint, as indicated at 40, so that when the joint-closing concrete is applied the outer walls of the panels are in effect extended uninterruptedly across the joint. In the construction of the frame member shown at the right-hand end of Fig. 17, the T-shaped reinforcement 38 is omitted, and the main reinforcing rods of the panel plates extending beyond the edges of the latter are bent at right angles and extended down through the top of the skeleton girder, and in this way interengage with the latter.

In the forms shown at the right-hand end of Fig. 15 and the left-hand end of Fig. 17 the attachment of the angles of the panel plates to the skeleton girders is relied upon as sufficient; it being understood that in all instances the nettings of the walls of the panel plates are extended so as to overlap and bridge the joint space between the edges of the panels.

In Fig. 18 I have shown a slightly modified form of panel plate construction and a slightly modified form of main frame construction; particularly as regards the main frame member shown at the right-hand end of the figure. In this panel plate the back ribs are of varying depth, increasing in depth from each edge of the plate toward the center, and one set of reinforcing rods are so embedded as to follow the convex contour of the inside of the plate. This affords a plate of great strength to resist outside pressure. The edges of the panel plate are formed by an angle metal frame and these angles are directly secured to the skeleton girders of the main frame members, shown clearly in the drawing. The main frame member at the left-hand end of the figure is like that at the left-hand end of Fig. 15 except only as to external contour. The main frame member at the right-hand end of Fig. 18 embodies a construction useful where the depth of the beam is not great. This frame member is composed of a fabricated metal beam 41 of inverted T-shape in cross section, the lateral flanges of which form the bottom of the beam and support the concrete. The angles 42 of the panel plate are bolted directly to the upstanding web of the member 41 and main reinforcing rods 43 of the panel plates are bent at right angles, extended through the outstanding webs of the angles 42 and thus positively anchored to said angles. The overhanging extensions of the outer walls of the panel plates meet and thus enclose the exterior of the space in which the concrete is poured to form the outer part of the beam or main frame member.

In Fig. 19 I have shown a double walled hollow panel plate which finds a special utility when used as a part of a hull constructed to be lighter than water. In general, the panel plate referred to is like the panel plates hereinbefore described, but after the set of grid-like ribs have been formed as a backing for the outer wall construction of the plate, a second continuous wall 44 is applied to the back of the panel plate, thus making of the spaces between the intersecting ribs closed cavities. In using plates of this construction I prefer to set them edge to edge in their proper places in the hull wall and then monolithically unite them and at the same time form a beam or grider by placing suitable reinforcements 45 and 46 within the spaces formed by the overhanging flanges; interlocking the projecting reinforcements 47 of the panel plates for instance by bending them at right angles, and then investing the reinforcements and filling the space to form a beam by pouring the concrete therein, all as clearly shown in the figure.

In Fig. 20 I have shown a modification of the panel plate shown in Fig. 19. That is to say Fig. 20 represents a double walled panel plate with closed cavities 48, but in this instance the plate is made convex as to both outer and inner surfaces. Moreover the plate is provided with a marginal metal angle frame 49 desirably located coincident with the middle plane of the plate and the reinforcements 50 are connected with this plate, as is the case in several of the previously described panel plates. Outer and inner, truss disposed reinforcements 50' are provided in the walls of the plate, as indicated in dotted lines in the figure. Such a plate obviously affords maximum strength for resisting both internal and external pressures.

In Fig. 21 I have shown still another modification in which the panel plate is in construction much like that shown in Fig. 15 but differs from the latter in that two longitudinal and two transverse sets of reinforcements are provided as indicated at 51, 52, and these reinforcements are bowed outwardly between their ends so as to afford the maximum truss effect.

In Figs. 22 and 23 I have shown in cross section a fragment of panel plate embodying a novel form of what I term "expanded" concrete. In order to secure both lightness and maximum strength, in lieu of the grid-like backing of ribs, I make the back of the plate devoid of ribs and form it of concrete within which I place properly distributed hollow capsules of cells 53. In the preferred construction shown these cells are cylindrical with spherical ends; are formed of sheet metal and are positioned by stretching two sheets of netting 54 upon the marginal frame of the plate, suitably spaced apart and having suitable sized meshes so that said capsules, when inserted as to their upper and lower ends in the meshes, will be held in place pending the pouring of the concrete. In order to better distribute the investing concrete, I prefer to arrange the capsules in staggered relation, as shown clearly in the drawing. In a plate of this construction the concrete proper is of the same consistency and strength per se as though no capsules were present. In other words, it differs radically from a spongy mass of concrete. Moreover the capsules, formed of sheet metal, very largely if not entirely compensate in strength for the concrete which they displace, so that the structure is extremely strong though relatively of light weight.

In so far as this feature of my invention is concerned, it is of course obvious that such expanded concrete may be made with a wide variety of capsules both in shape and details of construction. Moreover it is not at all essential that the capsules be placed regularly nor that they be supported by netting reinforcements or the like. On the contrary the capsules may be mixed into the concrete precisely as is the larger mineral aggregate in ordinary concrete. In Figs. 4 to 9, inclusive, I have shown various modifications of hull construction differing from that shown in detail in Fig. 3. All of these figures 4 to 9 inclusive are somewhat diagrammatic, in that the details of the frame members and panel plates are largely omitted.

Fig. 4 shows a construction in which the longitudinal frame members are of solid construction, as indicated at 55; instead of providing separate main longitudinals at the upper and lower angles of the hull, the longitudinals 55 are spaced apart and the spaces between them bridged by panel plates 56 which are externally cylindro-convex so as to provide the proper cross sectional contour. Interiorly the hull is braced by vertical and transverse struts 57 and 58.

In Figs. 5 and 5^A I have shown a construction generally like that shown in Fig. 3, but provided with I-beams 59 corresponding to the I-beams 10 of Fig. 3 but of greater depth, and these I-beams are disposed in such position as to serve as track rails for an overhead traveling crane. The deck of the hull is provided with a series of hatches 60 which desirably extend entirely across the deck practically from one rail 59 to the other, so that an overhead crane equipped with suitable hoisting apparatus may work through these hatches in loading and unloading with the greatest facility. The deck, between hatches, is supported by pillars or struts 61 and the sides of the hull are tied together by the cross struts 62.

Referring to Fig. 6, the distinctive features of this construction are the X-shaped pillar or strut frame 63, the hollow concrete longitudinal stringers 64 and the solid concrete panel plates 65'. In a ship's hull which is provided with transverse hatchways this X-shaped bracing frame is a matter of great importance. Without resorting to the use of bulkheads, such form of structure affords ample strength to tie the deck structure and the bottom of the hull rigidly together and at the same time the X-shaped bracing members 65, disposed between, and attached to, the verticals 66, and the latter tied together by the members 67, make the hull rigid and amply strong to resist torsional, tensional and compressive stresses.

In Figures 8 and 9 I have shown two cross sections of half hulls wherein a very simple and strong hull is secured by the use of one type only of a standard pre-cast plate having a slightly curved exterior. It will be seen that by this means, if desired, a hull can be readily formed of desirable cross section with the use throughout the greater length of the hull of but one typical standard ship plate. By this means I also make both top and bottom of the hull, as well as the sides suitably convex, so as to present a very strong yet desirable cross-section in resisting external pressures.

Where a hull of great length is to be formed requiring in such case a very large amount of longitudinal reinforcement, I apply, as shown in Figure 9, after first completing the hull proper, the proper quantity of structural steel shapes run longitudinally on the top and bottom of the hull either externally or internally 69 and 70. This longitudinal steel 68 is preferably attached to the exterior of the hull, however, as shown at 69 and at regular intervals preferably at every transverse bulk-head it is rigidly attached and anchored to vertical steel members passing through the bulk-head and attaching to the corresponding longitudinal steel on the opposite side of the hull. By this means a complete longitudinal steel framework rigidly connected is formed about the top and bottom of the hull. This can be placed in position after the hull proper, 71 is completed, the vertical steel framing at the bulk-heads being placed while forming the bulk-heads. To complete the operation this longitudinal steel framing is then covered with a protection of concrete but because of the steel being rigidly framed together, it is unnecessary to surround it with a large proportion of concrete otherwise necessary in suitably designed and typical reenforced concrete work. In this way a large amount of weight and material is saved while at the same time the proper strength is secured.

Steel rails, I-beams or other suitable shapes can be used for this purpose. They can also be anchored to the hull at various points along their length in addition to their through connection at the bulkheads. The quantity or cross section is diminished in proper graduation from the center of the hull to the bow and stern in exact proportion to the decreasing longitudinal stresses which are brought to bear on the hull at sea.

It is obvious that the number and location of these fabricated reinforcements may be distributed across the top and bottom of the hull in any desired manner. In the preferred form where attached to the exterior I can accomplish this when the hull is in the water by the methods described in my co-pending application, placing the same first on the upper side of the hull and then after turning the hull over in the water applying the corresponding members to the opposite bottom side of the hull, which is thus brought above the water for this purpose.

The longitudinal and transverse framing in Figures 8 and 9 are of the same type heretofore described, being girders wherein the steel either as reinforcement or as structural steel framing is disposed in girder forms of great depth in comparison with the customary methods employed hitherto described in ship construction.

Figure 9 also shows the provision of a longitudinally disposed median line partition 72 which may be built monolithically of reenforced concrete or constructed with my pre-cast plates the edges of which are framed together forming strong vertical and horizontal framing throughout the length of the bulk-head. These serve to greatly stiffen the hull against flexing stresses in a vertical plane.

In Figures 24 and 25 I have shown a form of construction peculiarly adapted to carry out my improved method of assembling hull structures upon the water. I have shown only the lower half of the hull and it will be understood that its superstructure may be of any suitable or preferred construction.

The main lower longitudinals 73 and 74 are unusually large in cross section, have relatively light walls and are hollow; their construction being such that they are decidedly buoyant when in the water. As shown, each member 73 comprises a skeleton hollow metal frame 74 invested in concrete and provided with such longitudinal reinforcements as may be found necessary. Similarly the frame member 74 comprises a hollow skeleton frame invested in concrete and provided with suitable longitudinal reinforcements. The panel plates 75, 76, may be like or substantially like those described in connection with the description of Fig. 3, etc., or they may be of other suitable construction. So also the transverse girders 77 shown in cross section of Fig. 25 may be of any suitable construction; those shown being relatively deep and thin so as to not be excessively heavy.

With hull units embodying the characteristics described, the procedure or method of making and assembling them may be substantially as follows:

The main longitudinals 73 and 74 are pre-formed preferably on shore and so constructed that their cavities are properly sealed. Preferably also the other units are pre-formed on shore. The set of three main longitudinals 73 and 74 are then placed in the water and connected up in length. They are then properly spaced apart and the transverse frames 77 and the intermediate pre-cast plates forming the hull bottom 75 are brought into position between the longitudinals and secured in place in a manner similar to methods previously described and preferably using a bolted riveted or suitable interlocking connection between plates and the hull frames. The joints are then further caulked and sealed with cement and the water pumped out from between the main floating longitudinals 73 and 74. Further sub-longitudinals 78 can then be added if desired properly attached to the transverse framing. In this manner a shallow boat-like structure is formed, having ample buoyancy upon which to erect the side wall transverse girders, to which may then be applied the side panel plates 76, thus completing the hull as high as it will ever be normally submerged. Therefore the upper main longitudinals and deck structure may be added in any preferred way and in an obvious manner. It will be seen that the foregoing method of construction and assembly entirely dispenses with the necessity of shipways.

If it is desired to do more of this assembling on the shore or ways than in the water, sections of the hull bottom and longitudinal framing forming the entire width of the beam can be assembled and formed in suitable lengths on the ways or in an entire hull length, launched in this condition, united lengthwise where the length of the hull is launched in sections and the sides then built up on this floating hull bottom, as just described.

In Fig. 26 I have shown a special form of panel plate which may be readily constructed in the same general manner as the panel plates previously described. The construction is one which may be varied as to external contour within wide ranges and therefore the plate is of special utility in forming the prow and stern portions of a ship. The plate is provided with the usual marginal metal frame 79; the usual two sets of intersecting reinforcing rods 80, 81, stretched across the frame in two directions and has the reinforcing rods 81 and continuous outer wall 82 mated to go with each other. The mold in which the panel plate is cast is provided with side walls, the upper margins of which are suitably shaped to give the exterior of the panel plate the desired warped contour when the concrete is screeded off by the aid of the edges of the mold.

Where port holes or other openings are required in the shell of the finished hull, I provide for this by casting port holes or the frames for these or any other openings required directly in the pre-cast plates in casting them.

When desired I also provide for the varying stresses to which different portions of the pre-cast plate will be subjected in its permanent location in the ship hull by modifying the depth or strength of the backing ribs on the plate. Thus for side plates, which when the ship hull is submerged are exposed to a graduated increasing stress from the increased external water pressure, I provide, when desired, back ribs which are correspondingly graduated in increasing depth or strength. This principle I further apply wherever found desirable throughout the hull for the purpose of securing maximum strength with minimum weight at all desired points, in the hull.

In the building of ship hulls, embodying my herein described structures, the conventional method of constructing the entire hull, in normal position on a shipway, from which the vessel is subsequently launched into the water, may be followed. My improved hulls, however, can also be built in accordance with the methods I disclose in my said co-pending applications for the building of multiple-unit reenforced-concrete ships, and these methods of construction and assemblage of the hull in sectional units will frequently be found preferable, particularly when the delay and expense of building shipways are to be avoided, and my "end-up" method of construction, either on the land, but preferably on the water, is to be availed of, with its several advantages.

In pursuing my latter method, I assemble in horizontal position the frame work and the precast plates, which are to form a subsequent transverse bulkhead in the finished hull. On this foundation are placed in upright position lengths of the frame work for the longitudinal stringers, girders or semiframe work, where same are of a structural steel formation. By this means, all temporary supports are eliminated, which would otherwise be required, were these placed in their normal horizontal position. A tier of precast plates is then placed between and attached to the vertical frame members, and with these in position, the first cross-rib sections, forming subsequent transverse framing, are put in position between the uprights, and attached to these and to the course of precast plates below. Another tier of plates is then added above these and between the uprights and the process so continued and repeated until a hull unit of desired length is obtained, standing in vertical position. As each tier of plates and cross-ribs are added, they and the upright longitudinals are preferably concreted in, so that when the top is reached, the unit section is completed ready to receive the top bulkhead covering, which is then framed in, sealing up the unit, which then becomes ready for righting in the water in horizontal position.

If the above has been done on land, it is then launched on its shipway in vertical position. If the process is carried on in the water, as explained in my prior application, a course of outer shells on the edge or near the edge of the bulkhead is built up to form the necessary pan for floating, and this pan is then transferred to the water by means of a skidway or with a derrick. The building up is then carried on while floating in the water. If desired, the horizontally placed bulkhead can be supported in or above the water by adjustable stilts, which can be raised or lowered, as desired, and removed at the proper time. These will prevent the unit from rocking, while heavy sections are being added with derricks, to one side or another, and can also be relied on, if desired, to prevent the horizontal bulkhead from sinking in the water until sufficient hull sections are in place to exclude the water, when the unit is allowed to sink. The bulkhead, itself, may be designed and constructed to float of its own displacement, as previously explained, in which case it is not necessary to erect a vertical rim for excluding the water, when placing same afloat.

In lieu of the above, the bulkhead may be formed or placed on a floating support or pontoon, and the erection thereafter continued, as already described, the floating support or pontoon being subsequently submerged and removed, in accordance with my previously outlined systems of construction.

Under this multiple-unit method of construction, projecting members of the longitudinal framing are left extending out at the ends of the unit. After the completed units are righted in the water in horizontal position and brought end to end, steel connections, in the form of plates or other shapes, are used to unite the extending framing into a continuous longitudinal member, so as to develop the full tensional strength throughout the full length of the hull. The union, so riveted, bolted or anchored together, may be then permanently secured, reenforced and bonded by a filling of concrete around these jointed members. The space between the longitudinal framing, if not filled solid with concrete, may be covered and united with precast plates, bolted or connected to the transverse ribs, projecting from the opposing ends of the two units and the joints completed with concrete, as elsewhere throughout the hull.

It will be found that by means of this end-up construction, which is made possible by the unit system of construction, the placing of the steel frame work or the reinforcing steel where the frame work is of typical reenforced concrete design, and similarly, the placing of the precast plates and the pouring or placing of the concrete in conjunction therewith, is greatly simplified and expedited, while any form work required is handled with greater ease and more quickly removed. Moreover the quality of the concrete, poured in vertical position under its own weight, will be denser and more free from pockets and shrinkage cracks.

The hull sections, as will be known, are preferably of cylinder formation so as to present great compression strength in resisting stresses, and so as to furthermore permit of their being turned over in the water, particularly when using the unit system of construction and water assembling. In this case the hatches in the deck of the hull are closed, and after the connection between units is completed for the portions above water, the hull or the sections of hull which are then being united will be turned half over, so that the remaining portions still to be connected, are brought above water and the union then completed. It will be observed that when the hull is so turned over in the water, even if the hatches leak or are open, the water will be kept out, so that the hull remains floating, on the same principle as that of a diving bell. After the main structural hull is so united throughout the length of the vessel, any desired upper bulwarks, decks, cabins, forecastles, etc., may be built on and added to the hull proper, with further precast plates, poured work or any other method of construction.

One of the features of my invention, in relation to the construction of the "longitudinal type," with long span girders, is the use of a steel frame work of standard size and shapes throughout the length of the girders. To this standard frame is added, in the center of the ship where the greatest tensional and compressional strain is exerted, the largest amount of reinforcing rods, which are embraced within the frame work of the steel girder or are anchored to its sides in most advantageous positions. As the girders approach the ends of the hull, from amidships, the quantity of reinforcing rods or their cross section is correspondingly reduced, so that only the proper amount of steel and weight, as is required, is furnished at each point, while at the same time the fabricated steel frame work is made to a standard stock size throughout, so simplifying the production and reducing cost.

Furthermore, as these longitudinal girders approach the tapering ends of the hull, intermediate girders are allowed to die out at proper points, terminating and connecting into transverse headers, when such design is preferred.

Another particular and very advantageous feature of my ship construction, in relation to the framing, is the placing, in certain instances, of the main portion of the longitudinal steel which is the largest element of reinforcement in the ship in the four outermost corners of the hull's cross section, so that this framing and reinforcement becomes common to both the horizontal and the vertical sides of the hull, so that the same frame work of steel and reinforcement is sufficient to provide for both the longitudinal and transverse stresses at one and the same time, and in each case, because of its position, to develop a maximum strength. These four main longitudinal framing members, placed in the four corners of the hull, I preferably make of large tubular design, and of such shape as to form the curving lines of the hull, so that these molded portions may be shaped at will in securing most desirable models of bow and stern, offering the least resistance to the water. These four longitudinal frames are, in turn, braced and secured in place by vertical and horizontal beams, spaced apart according to the width of the precast plates to be used and to these transverse beams, the precast plates are anchored, tied and concreted in place along with the longitudinal members, all as hereinbefore described. Where the beam of the hull or its molded depth are sufficiently great to make it desirable, additional intermediate longitudinal girders can be carried in addition to the four main corner longitudinal frames, but the aim, so far as feasible, is to carry the greater mass of the longitudinal steel in the four corner members. This is, of course, supplemented by the longitudinal steel carried in the precast plates, which develops its full value after the plates are anchored in place in the frame work of the hull.

The four corner longitudinal frames of the hull are preferably shaped to a curve in cross section, which will lend strong compression resistance to the transverse section of the hull, as well as distributing stresses to the greatest advantage. At the same time, this curved contour forms the bilge of the hull and is modified in shape to suit the case, as the ends of the hull are approached. In view of the curved nature of these frame members, it is preferable, generally, to concrete these in position, or as a complete member, and to then place between these curved longitudinal members, the precast plates, forming the flatter and straighter surfaces of the hull within these curved boundaries. Carrying this same purpose further, it is also found frequently desirable to concrete in conjunction with these four corner longitudinals, in poured or molded formation or other field methods of placing concrete, the extreme prow and stern sections of the hull, filling in the balance of the hull with precast plates between the longitudinals and the stern and prow. In this manner, a monolithic frame work or skeleton of a hull, self supporting and of great strength, is secured and to this and within these frames, the precast plates are then affixed. By this means, furthermore, it becomes unnecessary to shape precast plates to form the more difficult and complicated curves, common to the extreme stern of most hull designs. Hence a standard shaped precast plate can be used for the greater part of the sections to be covered with concrete plates.

My preferred framing for the main longitudinals is of the fabricated latticed steel construction described, to which the "forms" can be attached, and the concreting effected in the field to great advantage. They can be similarly concreted, if desired, by the pneumatic process or use of a "cement gun" and it is, of course, obvious that when desired, sections of these frames can be precast and assembled into a hull in connection with intermediate precast plates or in turn with concrete shells poured in position in the field.

One of the particular features of my invention is the ability to secure a hull shell of extreme lightness, yet with adequate strength, realizable by use of my precast concrete plates. These plates are preferably cast in horizontal position on a flat table form, open on the face or top. By this means, the surface of the plate can be screeded on marginal gauges to an exact thickness. Where concrete is poured in forms or placed by other field methods, which are necessarily uncertain and inaccurate, it is not possible to so obtain an exact thickness of the shell throughout. Because of this accuracy of formation, it is possible to employ a much thinner thickness of shell in these precast plates. In poured work, it is not found practicable to attempt a shell for hull construction of less than three inches as a minimum thickness, while five to six inches is the more frequent reliance. Three inches, however, is the minimum generally considered feasible, whether the concrete be placed with a cement gun in layer formation or poured in forms. By my method, however, I can reduce the thickness of the shell to one inch and secure the very highest quality of concrete and workmanship over all portions of the plate, because of its being exposed to view and accessible, while being formed.

One of the notable features of this improvement of constructing concrete ship hulls with these precast rib plates to form the hull shell is the possibility, thereby, of placing the main reinforcements in the plate or hull shell at a great depth from the surface of the shell, so that it is thus protected in corresponding degree from the detrimental effects of water or more particularly salt water upon the reinforcement in concrete, which it has been found is much greater where the reinforcement is nearer the surface exposed. In my precast plates a large part or the greater part of the main reinforcement of the plate is carried deep in the ribs where it is very fully protected, while at the same time developing the greatest strength.

It has been found, by extensive investigation, by the United States Bureau of Standards that concrete submerged in water is prone to deterioration, only when its surface, which is carbonized in setting, is abraded or broken into and when the carbonized surface is preserved, the life of the concrete is found to be almost indefinite. It has been at the same time noted, under this investigation, that the effect of salt water on reenforced concrete is to cause a rusting of the reinforcing steel, at least if not galvanized from the salt moisture penetrating the concrete, with a consequent rupturing of the concrete from the irresistible expansion of the iron oxide consequently forming, this disintegration being proportional to the closeness of the reinforcement to the exposed surface of the concrete.

One of the important and salient features of my improvement is the provision against this deterioration and disintegration of the concrete, which is made particularly feasible and practicable in the formation of these precast concrete ship plates. Towards this end, where this protection is desired, I leave the top surface of the plate in casting, rough, or preferably scoriated, and where desired for still greater bond, I provide extending reinforcement from the cement face of the plate, so as to provide either a mechanical or reenforced bond or both between the cement face and the further protecting face, which is now to be added to the precast plate. After the cement work has hardened, I then add a top finish of hot asphaltum concrete, similar to that used for road work where fine crushed stone is mixed with a hot asphaltum binder. After this has been uniformly distributed over the face of the plate and firmly and compactly pressed and levelled or screeded, a final surfacing of asphaltum, ironed smooth, is then added to complete the plate. Within this asphaltum concrete layer is preferably embedded a light wire mesh to insure the permanency and tenacity of this exterior protection.

When these precast plates, so surfaced and protected are permanently assembled in the hull formation, the adjacent edges of the asphaltum concrete surface are then united by heating and ironing or welding together, with the addition, if necessary, of further material and by this means, the finished hull is completely sealed and made into a monolithic and watertight whole. Those portions of the hull, if any, which present exposed surfaces of concrete, placed in the field, may be coated in place to form a union with the asphaltum surfaced plates.

The above described surfacing is not to be confused with the mere tarring or asphalting of a concrete hull, which is but a temporary and uncertain waterproofing expedient only. My improvement provides a hard, dense, stone protected, waterproof conglomerate surface, which is not only impervious to water, but which, because of its refractory nature, protects the basic cement concrete and its carbonized surface from abrasion. It is needless to add that in the formation of these precast plates, under my method of construction, other desirable mixtures or surfaces of impervious or protecting materials can be similarly formed thereon, either while the concrete is fresh or after it has hardened, as may be found most suitable for the particular material.

Another feature, in connection with the formation of these precast plates, is that they may also be made by machine, the concrete in rather dry mixture being pressed by machinery, so as to receive the ribbed formation which is then retained until the concrete sets. By this method, plates of great density can be formed under hydraulic presses, while only one stamping form is required in turning out a continuous output of plates.

By my method of forming the shell of the hull in sections, cast horizontally with one face open and accessible, it is possible to distribute at different points and locations in the shell or concrete member, different mixtures and varieties of concrete to best serve different and distinct purposes. By virtue of this opportunity, one of my improvements is to place expanded concrete in various portions of the shell plate, in precasting it, by locating in other portions the stronger higher compressive solid concrete. By this means, I am able to produce a plate of extreme lightness and comparatively great depth or thickness, with a small quantity of concrete expanded and having extending throughout same longitudinal and transverse ribs of the denser solid concrete, having this extreme depth, while adding but little to the weight of the member or shell because of this skeleton formation within the concreted cell. At the same time I preferably have a layer of this solid concrete on both faces of the plate, so that the expanded concrete is entirely contained and armored within the body of the shell.

In another form, the expanded concrete forms the body of the plate throughout. Its exterior face is united to and protected by a thin layer of asphaltum concrete, while its inner face and projecting cross ribs, when wanted, can be formed of the solid concrete if greater strength and density is desired at these latter points.

I claim as my invention:

1. A ship hull comprising major longitudinal beams extending from prow to stern, transverse girder frames widely spaced apart longitudinally of the hull and connecting said longitudinals and separately formed panel-like sub-frame units fitting within the quadrangles formed by the intersections of the longitudinal and transverse frame members.

2. A ship hull comprising major longitudinal beams extending from prow to stern, transverse girder frames widely spaced apart longitudinally of the hull and connecting said longitudinals and separately formed panel-like sub-frame units fitting within the quadrangles formed by the intersections of the longitudinal and transverse frame members, said sub-frame units being formed of reinforced concrete.

3. In combination with a suitable hull framing, unit panel sections fitting within said framing to form the shell of the hull, each panel section comprising a marginal, metallic frame directly united to the hull framing, a system of metal reinforcements and an investment of concrete.

4. In combination, a suitable hull framing, preformed panel sections supported by said framing to form the shell of the hull, each panel section being provided with reinforcing rods, concrete enclosing said reinforcing rods, and metallic connecting elements embedded in the edges of said panels with the outer face substantially flush with the corresponding face of the concrete, the reinforcements of one panel being connected to those of an adjacent panel.

5. In combination with a skeleton metallic hull framing, unit panel sections applied to said framing to form the shell of the hull, each panel section comprising a system of metal reinforcements and an investment of concrete and having exposed metallic connecting elements embedded in the edge of the panel, whereby the panel may have a metal-to-metal union with said hull framing.

6. A ship hull frame comprising major longitudinals spaced apart, and a plurality of pre-formed reenforced concrete panels to fill the spaces between the longitudinals, each panel comprising a marginal frame of structural iron, a system of reinforcing elements extending across said frame in two directions, and an investment of concrete applied to the skeleton frame thus formed to make a relatively thin, continuous outer wall projecting beyond the marginal frame.

7. A ship hull provided with a shell made of concrete subject to cracking by shock, and an outer surfacing layer of shock-absorbing material of substantial thickness applied to the exterior of said shell.

8. A ship hull having a shell of reenforced frangible concrete, and a waterproofing and shock-absorbing layer of asphaltic concrete applied to the outside of the shell.

9. A ship hull frame comprising four major longitudinals, each formed of reenforced concrete, two of said longitudinals coinciding with the bilge keel positions and both of these taking the form approximately of a 90 degree segment in cross-sectional shape.

10. A ship hull frame comprising four major longitudinals, each formed of reenforced concrete, two of said longitudinals coinciding with the bilge keel positions and both of these taking the form approximately of a 90 degree segment in cross-sectional shape and made hollow.

11. A ship hull frame having major corner longitudinals formed of reenforced concrete, substantially quadrant-shape in cross-section, the curved portions thereof constituting portions of the exterior walls of the hull.

12. A ship hull frame having major corner longitudinals formed of reenforced concrete, substantially quadrant-shape and hollow in cross-section, the curved portions thereof constituting portions of the exterior wall of the hull.

13. A ship hull comprising a skeleton frame of substantially straight members, and a covering of concrete applied to said frames and outwardly molded into the desired curved contour of the hull.

14. As a new article of manufacture, a panel plate for ship construction, comprising a continuous outer wall of warped contour, a marginal metallic frame depressed below said wall and a reenforced backing.

15. As a new article of manufacture, a panel plate for ship construction, comprising a continuous outer wall, having a warped surface, a metallic marginal frame depressed below said wall and metal reinforcements extending through and across said plate from marginal frame to marginal frame.

16. As a new article of manufacture, a pre-formed panel plate for ship construction, comprising a marginal metal frame, a continuous outer wall of warped contour, a set of reinforcing ribs formed integrally with said outer wall and lying within said metal marginal frame, and reinforcing rods extending through said ribs from edge to edge of the plate.

17. As a new article of manufacture, a preformed panel-plate for ship construction, comprising a metal-bordered frame, an outer concrete wall, a set of reinforcing ribs formed integrally with said wall and lying within said frame, and reinforcing rods extending through said ribs from edge to edge of the plate.

18. As a new article of manufacture, a preformed panel-plate for ship construction, comprising a metal-bordered frame, and a wall of concrete cast in and having its surface raised above said frame.

19. As a new article of manufacture, a preformed panel-plate for ship construction, comprising an outer concrete wall, a metallic marginal frame depressed below the surface of said wall, and metal reinforcements extending through and across said plate and connected to said frame.

20. As a new article of manufacture, a preformed cellular concrete panel-plate for vessel walls, and having an outer wall and an inner wall more widely spaced from the outer wall in the middle of the plate than at the margins thereof.

21. As a new article of manufacture, a preformed cellular concrete panel-plate for vessel walls and having a convex outer wall and an oppositely curved inner wall.

22. As a new article of manufacture, a preformed panel-plate for vessels, comprising a metallic marginal frame, the edges of said frame lying in the same plane, and a concrete wall carried by said frame and provided with a curved outer surface.

23. As a new article of manufacture, a preformed panel-plate for vessel walls, comprising a skeleton frame formed of straight frame members, and a concrete wall carried by said frame and provided with an exterior surface curved irregularly with respect to the frame.

24. As a new article of manufacture, a concrete panel-plate for vessels provided with an exterior surface arranged to conform with the curvature of the vessel skin, and provided with integral backing ribs, the rear edges of which are shaped without conformity with the exterior curved surface.

25. As a new article of manufacture, a preformed panel plate for vessel walls, comprising a cellular concrete slab having embedded therein metallic connecting elements having their outer faces substantially flush with the edges of the slab for direct connection with a metallic support.

26. A ship hull, which includes a set of four tubular girders constituting corners of the ship section, panels interposed between pairs of said girders to form the side walls of the vessel, and panels interposed between the two bottom corner girders to form the bottom wall of the vessel.

27. A ship hull constructed of four tubular corner girders, and having pre-formed panels interposed between and connecting said girders whereby a substantially rectangular section is provided.

28. A ship's hull, comprising four longitudinally-extending tubular corner girders, transverse frames connecting and supporting said longitudinal girders, and panels connecting and strutting apart said longitudinal girders.

29. In ship construction, the combination of a set of four longitudinally-extending corner stringers, transverse frames connecting and supporting said longitudinal stringers, and pre-formed panels set between said transverse frames and supported thereby.

30. In a ship construction, the combination of a set of longitudinal framing members, each comprising a substantially horizontal and a substantially vertical part, transverse frames extending between and supporting said longitudinal frames, and paneling supported by said transverse and longitudinal frames.

31. In a ship hull, the combination of a series of longitudinal frame members, and pre-formed hull panels set between and connected to said longitudinals.

32. In the side of a ship, the combination of longitudinally-extending frame members, transversely-extending frame members connecting longitudinal frame members, and pre-formed hull panels interposed between and connected to said transverse and longitudinal frame members.

33. A ship's hull, which comprises a bilge corner plate having an outwardly and inwardly projecting keel member constituting a part of the longitudinal frame work.

ROY H. ROBINSON.